April 12, 1960 C. E. SCHOU 2,932,216
VARIABLE SPEED DRIVE
Filed July 16, 1956 5 Sheets-Sheet 3

INVENTOR
CARL E. SCHOU

BY

ATTORNEYS

April 12, 1960  C. E. SCHOU  2,932,216
VARIABLE SPEED DRIVE
Filed July 16, 1956  5 Sheets-Sheet 4

Fig. 3

POWER TRANSMITTED THRU
BELT DRIVE IN LOW AND REVERSE SPEED RATIO

G.V.W. = 11,700#
Input r.p.m. = 1900
Output Torque Variable Transmission = 1310#" = 33% of Peak Torque
Rolling Resistance Factor = 0.15
Fixed Ratio = 40.00-1
L.R. = 30.1

| Vehicle Speed in m.p.h. | Speed Ratio Variable Transmission Shaft 14 to Ring Gear 192 | Speed Ratio Belt Drive A | Speed Ratio Belt Drive B | Torque in ft. lb. Sungear (277) 184 | Torque in ft. lbs. Sungear (38T) 200 | Tension Load Difference From One Side of Belt To the Other Side Tension Belt A (80) | Tension Belt B (84) |
|---|---|---|---|---|---|---|---|
| 5.40 | 0.618 | 1.65 | 0.60 | 560 | 695 | 175 | 88 |
| 4.38 | 0.50 | 1.48 | 0.67 | 560 | 695 | 167 | 92 |
| 3.50 | 0.40 | 1.34 | 0.75 | 560 | 695 | 153 | 96 |
| 2.63 | 0.30 | 1.22 | 0.82 | 560 | 695 | 146 | 100 |
| 1.75 | 0.20 | 1.10 | 0.91 | 560 | 695 | 136 | 104 |
| 0.87 | 0.10 | 0.99 | 1.01 | 560 | 695 | 131 | 112 |
| 0.00 | 0.00 | 0.90 | 1.11 | 0 | 0 | 0 | 0 |
| -0.87 | -0.10 | 0.81 | 1.22 | 560 | 695 | 119 | 121 |
| -1.75 | -0.20 | 0.73 | 1.37 | 560 | 695 | 113 | 128 |
| -2.63 | -0.30 | 0.66 | 1.51 | 560 | 695 | 109 | 137 |
| -3.33 | -0.38 | 0.60 | 1.65 | 560 | 695 | 105 | 145 |

INVENTOR
CARL E. SCHOU
BY Strauch, Nolan & Neale
ATTORNEYS

April 12, 1960

C. E. SCHOU 2,932,216

VARIABLE SPEED DRIVE

Filed July 16, 1956

INVENTOR
CARL E. SCHOU

BY
Shannon, Nolen & Neale

ATTORNEYS

United States Patent Office 2,932,216
Patented Apr. 12, 1960

2,932,216

VARIABLE SPEED DRIVE

Carl E. Schou, Oshkosh, Wis., assignor to Rockwell-Standard Corporation, a corporation of Pennsylvania Application July 16, 1956, Serial No. 598,158

23 Claims. (Cl. 74—689)

This invention relates to improvements in vehicle drive trains and has particular reference to an infinitely variable speed mechanical transmission.

The transmission of this invention as illustrated and described is adapted for use in the drive train for low speed agricultural vehicles. In crop harvesting vehicles, such as harvester combines, the engine should be governed to operate at a relatively smooth, substantially fixed speed to provide constant power for the harvesting components such as the header conveyor, separator, elevator, grain line and blower. Because of this particular requirement, mechanism to enable vehicle speed adjustment must be provided between the governed speed power take-off from the engine and the vehicle driving wheels.

Pre-existing combine propulsion drives, as a rule, consist of a manually operated transmission having from four to six speeds, a manually operated clutch and finally an infinitely variable speed drive with a maximum ratio spread equal to the steps in the transmission gear box. Operation of these units in the field require that the operator constantly adjust the speed of the vehicle to obtain maximum combine efficiency. This required constant adjustment is somewhat tedious even when the terrain is generally level, but it becomes particularly difficult to continually select the correct drive ratio when the terrain is hilly or uneven. All installations of previously known four to six speed transmissions are far too heavy to satisfactorily fulfill the requirements for light weight transmissions that are desired in present day light combine units. The drive belts in combine transmission drives carry the full vehicle drive load and are used to obtain the infinitely variable speed drive within the spread of the reduction ratio steps in the transmission gear box, hence such belts are subject to greater wear than are other working parts in such drives.

Accordingly, the primary object of this invention resides in the provision of an improved infinitely variable speed mechanical transmission, and a corollary object resides in the provision of this improved transmission adapted for use in agricultural harvesting vehicles, particularly harvester combines.

A further object resides in providing an improved transmission for harvesting vehicles and the like to enable a high range of vehicle speeds for highway travel from job to job, a low range of vehicle speeds for crop harvesting and similar operations and a reverse speed range.

A still further object resides in providing an improved infinitely variable speed vehicle transmission that eliminates the necessity for declutching at vehicle working speeds to change the transmission reduction ratios.

Another object resides in the provision, in a crop harvesting vehicle, of a variable speed transmission of such improved construction and operation that the need for changing tires and the resultant necessity of transfer gearing changes on a combine vehicle, which were heretofore necessary when the vehicle was used for different crops such as rice, wheat, etc., are eliminated.

A further object resides in the provision of a new improved variable speed power drive which provides an infinite number of speeds between a maximum speed in forward and a maximum speed in reverse, any speed of which may be selected by a single speed control.

Another object is to provide a novel dual, V-belt, complementarily variable speed pulley design with a single speed control.

Still another object resides in the provision of a novel drive train including a planetary transmission having two input members and one output member driven by a dual, V-belt, complementarily variable speed pulley design with a single input member, two output members connected to the planetary input members and with a single speed control enabling an infinitely variable number of speed ratios between the pulley input member and the planetary transmission output member.

A further object resides in providing the aforementioned novel drive train with a compound planetary transmission connected to the aforementioned planetary system output member and to one of the pulley output members, enabling a variable high and low and a neutral control of the drive train output.

A still further object resides in a provision in a vehicle drive transmission of a reduction in speed ratios sufficient to maintain drive belt loading within conservative limits in order to obtain good life with commercial belts and at the same time to meet the vehicle speed requirements.

Further novel features and objects of this invention will become apparent from the following detailed description and the appended claims taken in conjunction with the annexed drawings showing preferred embodiments thereof, in which:

Figure 2A is a sectioned elevation of the dual driven pulley and the planetary transmissions while Figure 2B is a sectioned elevation of a dual driving pulley. Figures 2A and 2B can be joined and will thus illustrate an enlarged sectioned view of the transmission which is illustrated in Figure 1;

Figure 1:
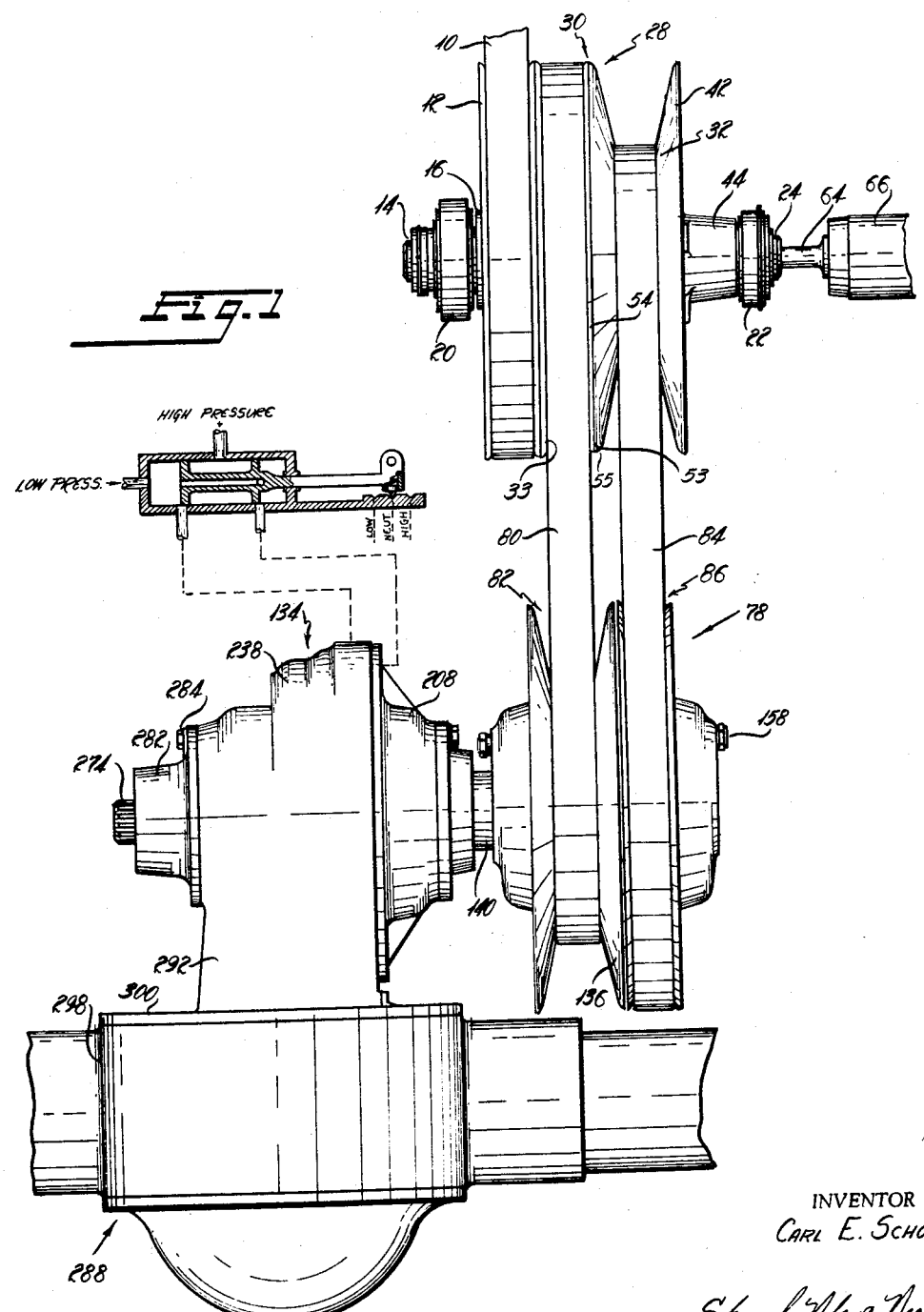
Figure 1 is an elevation view of my novel infinitely variable mechanical transmission.
Figure 2:
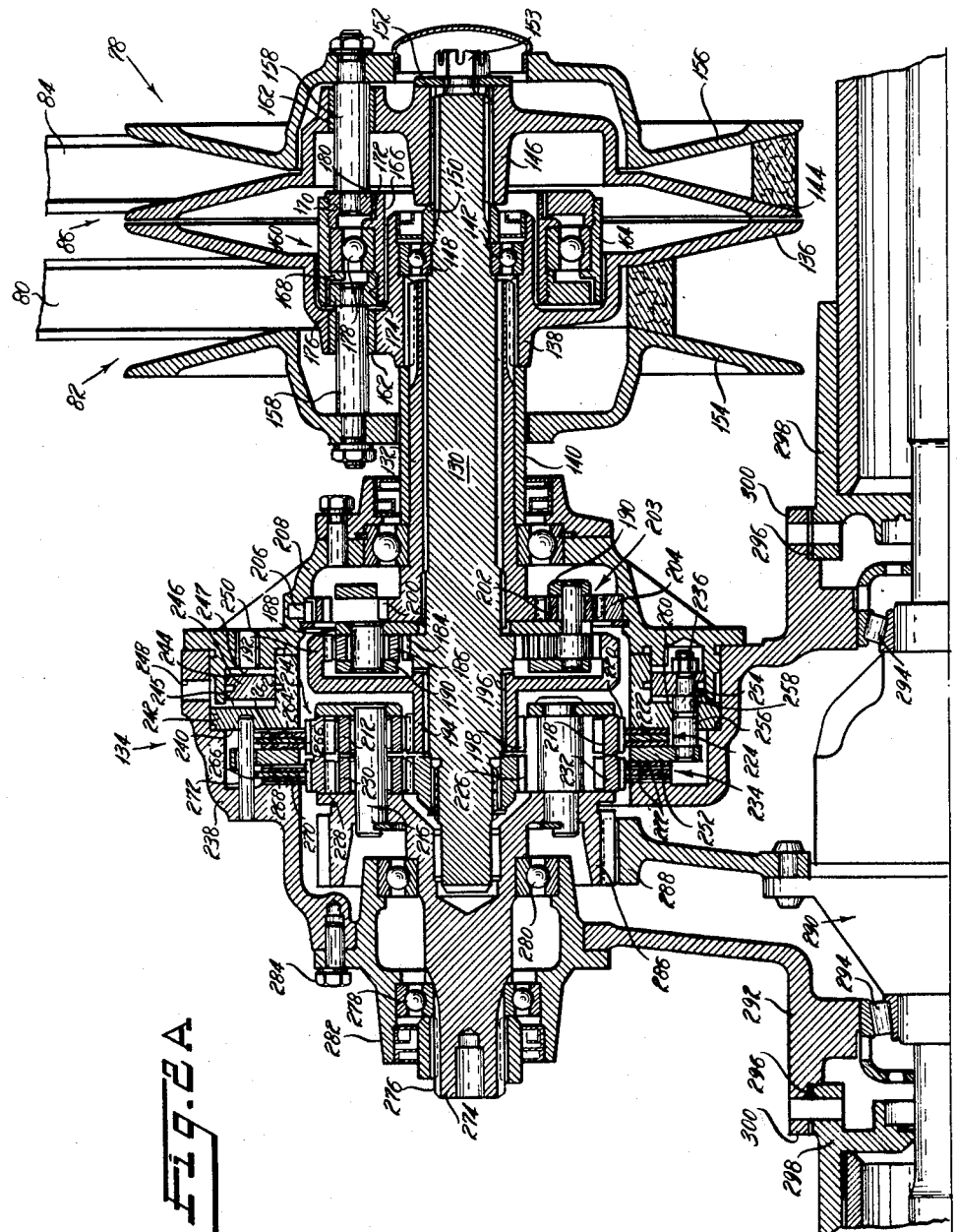
Figure 3:
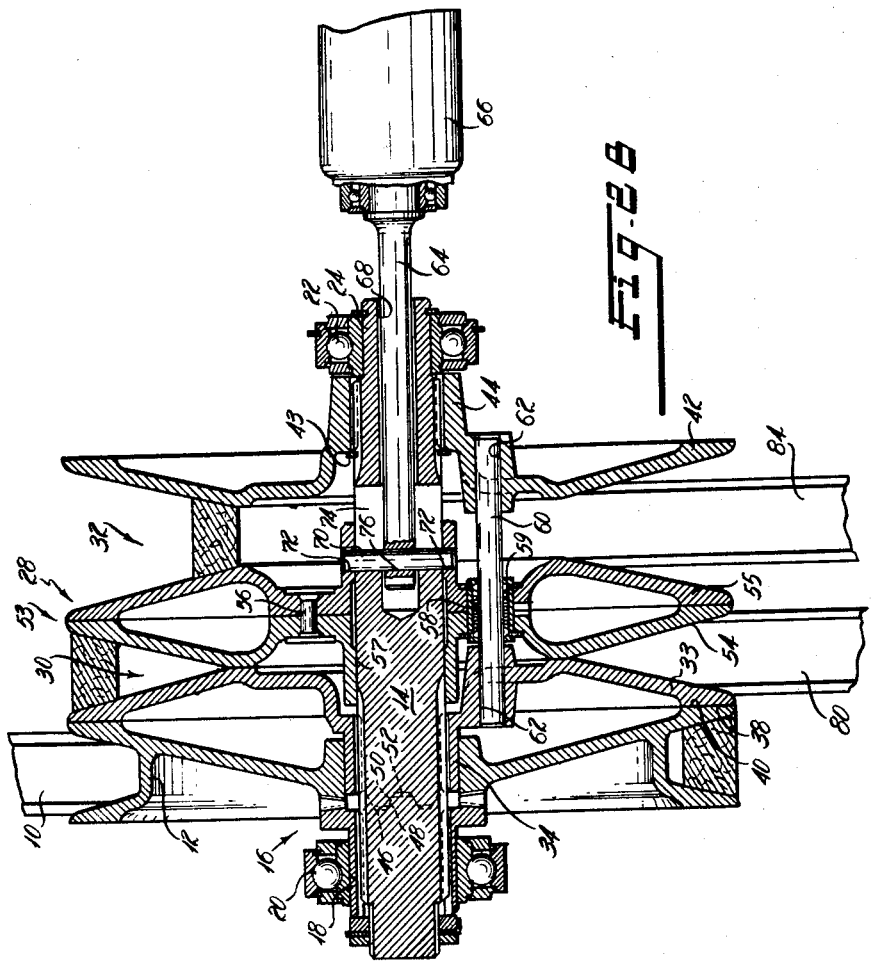
Figure 4:
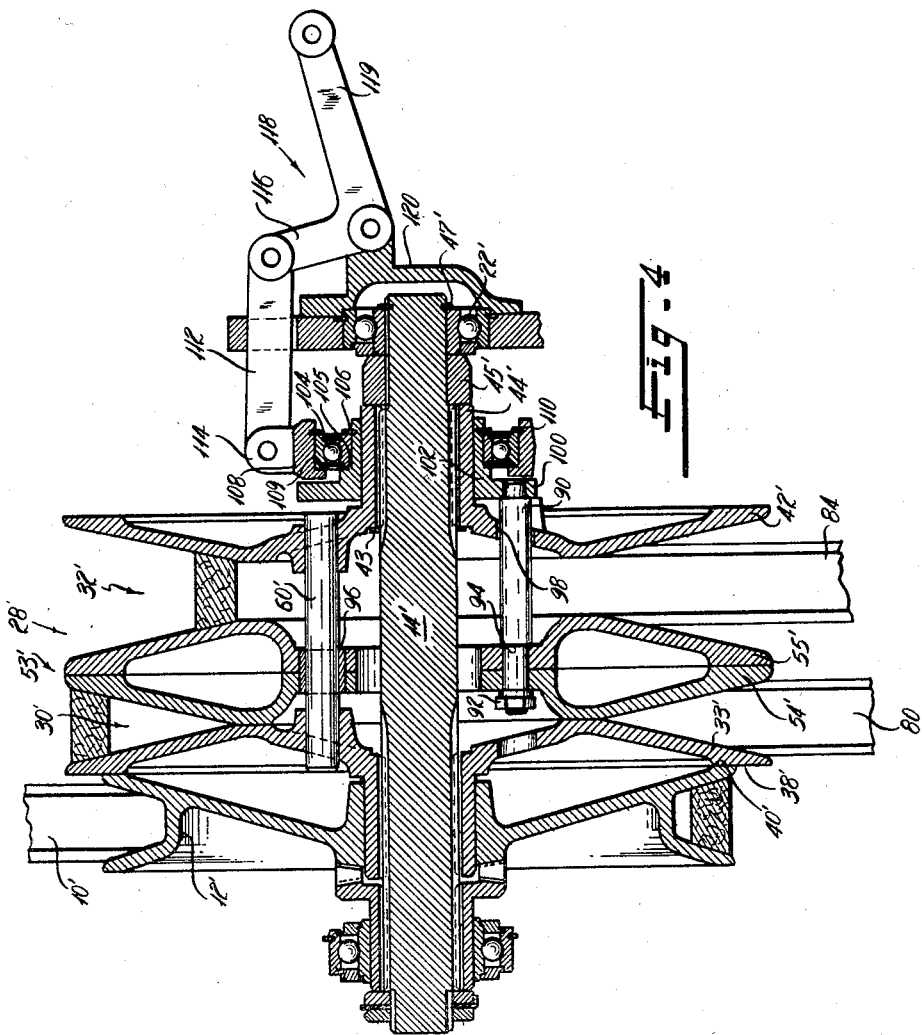

Figure 3 is a data sheet on the illustrated embodiment of Figures 1 and 2A and 2B for low and reverse speed ranges showing recorded test results by incremental related readings including vehicle speed, speed ratios of the variable transmission, speed ratios of belt pulley drives, torque of the sun gears and the tension in the belts; and Figure 4 is a sectioned view illustrating a second embodiment of the drive countershaft and drive pulley for use in the infinitely variable speed mechanical transmission of Figure 1. This figure can be substituted for the countershaft and pulley arrangement of Figure 2B and is presented on the drawing so it can be viewed with Figure 2A in the same manner as described above for Figure 2B.

Referring now to the drawings, the illustrated variable speed drive (Figure 1) provides a high range of vehicle speeds (5.4–14.1 m.p.h.) for highway travel from job to job and a low range of forward vehicle speeds (0–5.4 m.p.h.), with a reverse speed range (0–3.6 m.p.h.) for field working conditions. This variable speed drive provides such speed ranges even though the driving engine is closely governed to provide a smooth, constant speed drive for the other powered equipment contained on the vehicle.

*Complemental drive pulley assembly*

Input power to the transmission is furnished through a drive belt 10, which is driven at constant speed by a governed engine (not shown) and the belt 10 in turn engages pulley 12 to drive a countershaft 14 at the constant speed. Pulley 12 is carried on and is drive connected to the countershaft 14 through a belt tightener clutch 16, one part of which is a tubular member 18 internally splined to shaft 14. The countershaft 14 is supported in a frame structure (not shown) by two bearings, one a ball bearing 20 on tubular member 18 adjacent one end of the shaft and the second a ball bearing 22 on the shaft shank 24 adjacent the other end. Countershaft 14 mounts a complemental pulley assembly 28 with the two complemental belt pulleys 30 and 32. The outer sheave 33 of pulley 30 has a hub sleeve 34 which journals the pulley 12 and is internally splined to the same end of countershaft 14 as the tubular member 18. Sheave 33 is axially restrained by abutment of its perimetral side face 38 with a similar perimetral side face 40 of pulley 16.

The outer sheave 42 of pulley 32 has a hub sleeve 44 which is internally splined to the countershaft shank end 24 and is axially restrained by abutment of the end of sheave hub 44 with the inner race of ball bearing 22 and by a snap ring 43 in a groove in shaft 14. The belt tightener clutch 16 includes teeth 46 integrally formed on the end of the hub of pulley 12. The teeth 46 have ramp shaped sides 48 which engage complementary ramps 50 of teeth 52 on the clutch tubular member 18. The teeth ramps 48 and 50 are arranged so teeth 46 tend to climb teeth 52 when torque is transmitted from pulley 12 to the tubular member 18, which as described is splined to countershaft 14. This action will axially move the pulley sheave 33, because of force through the abutting faces 40 and 38 respectively of pulley 12 and sheave 33, to thereby decrease the distance between outer sheaves 33 and 42 forcing the pulley assembly belts to climb the pulley sheaves to an increased running pitch diameter until proper belt tensions are reached. Shrinkage of the belts, on the other hand, will cause the pulley sheaves to spread and the clutch teeth 46 to more deeply engage with teeth 52, limited only by bottoming of the teeth.

The complemental inner sheave assembly 53 consists of the inner sheave 54 of pulley 30 and the inner sheave 55 of pulley 32, the two sheaves 54 and 55 being secured together by fastening means such as the rivets 56. Sheave assembly 53 has a concentric bore 57 and is axially movable on shaft 14 from abutment with outer sheave 33 of pulley 30 (as shown) to abutment with outer sheave 42 of pulley 32 with bore 57 providing a loose sliding fit on the countershaft 14. The inner sheave sub-assembly 53 has several axially directed apertures 58, disposed circularly adjacent its inner perimeter, that retain ball bearing assemblies 59 for engagement with rods 60. These rods extend from and are mounted at their ends in openings 62 of sheaves 33 and 42 and thus provide positive drive connections between the outer and inner pulley sheaves while enabling reciprocation of the inner sheave assembly relative to the outer sheaves. An actuating rod 64 of an actuator 66, preferably hydraulic, extends into an axially disposed concentric opening 68 of countershaft 14 and connects with a pin 70 fixed in hub openings 72 of the inner sheave assembly 53, extending through a cross-slot 74 in countershaft 14, and thence through a cross bore 76 in the actuating rod 64. There is sufficient axial length of cross slots 74 for the axial range of movement of pin 70 when hydraulic actuator 66 moves the inner sheave assembly 53 for the various settings between the two abutment limit positions determined by the outer sheaves 33 and 42 as described above.

Pulley 30 is engaged by a belt 80 which in turn engages a driven pulley 82 (Figure 2A) and the pulley 32 is engaged by a belt 84 which in turn engages a driven pulley 86. Pulley belts 80 and 84 are made from the same material and are the same size, i.e., they are identical and interchangeable. The limit setting of the inner sheave assembly 53 of the complementary drive pulley 28, as illustrated and as described above, is the setting that provides the maximum velocity of belt 80 and the minimum velocity of belt 84. The other limit setting of inner sheave assembly 53 as described above (not illustrated) provides a minimum velocity for belt 80 and a maximum velocity for belt 84. There are an infinite number of belt velocity settings between these maximum and minimum settings of the inner sheave assembly 53 and when the velocity setting of one belt is increased by axial movement of the inner sheave assembly 53, the velocity setting of the other belt will be simultaneously decreased by a related amount.

*Modified complemental drive pulley*

In Figure 4, a second complemental pulley embodiment 28' has the outer sheave 33' of pulley 30' axially restrained by abutment of the sheave peripheral side face 38' with the peripheral side face 40' of pulley 12'. Outer sheave 42' of pulley 32', which is linked to sheave 33' by rods 60', is axially positioned and restrained on shaft 14' by a snap ring 43' and spacer 45', the inner race of ball bearing 22' and snap ring 47'. The inner sheaves 54' and 55', respectively, of pulleys 30' and 32', are secured together and fastened on the ends of a plurality of circumferentially disposed pulley setting rods 90 (only one being shown) by nuts 92 and rod shoulders 94, to form the axially movable inner sheave assembly 53' which is movable within the limits determined by abutment with outer sheave 33' of pulley 30' (as illustrated) and abutment with outer sheave 42' of pulley 32'. The inner sheave assembly 53' is supported for axial shifting on rods 60' by bushings 96. Rods 60' extend between and are mounted at their ends in openings 62' of sheaves 33' and 42', and rotatably connect the outer and inner sheaves of the complemental pulley 28' so all sheaves will rotate as a unit. Other suitable bearings can be used in lieu of the ball bearings 59 (Figure 2B) or the bushing 96 (Figure 4).

Pulley setting rods 90 extend through openings 98 in the outer sheave 42' and are fastened to a flange 100 integral with a pulley adjustment bushing 102, as by riveting. Bushing 102 is disposed with an axially slidable fit on the hub 44' of outer sheave 32' and supports the inner race of a ball thrust bearing 104 between bushing shoulder 105 and a snap ring 106 fixed in a groove in the bushing hub. The outer race of bearing 104 is held in an axially shiftable ring 108 between ring shoulder 109 and internal snap ring 110 fixed in a groove in the shiftable ring. A pulley shift rod 112 is pivotally connected at one end to a projection 114, integral with ring 108, and at the other end to an arm 116 of a bell crank 118 and the bell crank is pivotally mounted on a part of the frame assembly 120 which also supports the outer race of ball bearing 22'. Through linkage (not shown), adjusting control motion of bell crank arm 119 is transmitted through arm 116, shift rod 112, ring 108, bearing 104, bushing 102 and pulley setting rods 90 to move the inner sheave assembly 53' for the various settings between the aforementioned limit positions.

The countershaft 14' in this embodiment is solid. Other components are similar to the components of the complemental drive pulley 28 in Figure 2B.

*Complemental driven pulley*

Pulleys 82 and 86 of the complemental driven pulley 78 are axially aligned and disposed on concentric torque shaft 130 and tubular torque shaft 132, both of which extend into a planetary gear box portion 134 of the variable speed drive. Inner sheave 136 of pulley 82 is non-rotatably fixed, through its hub 138, to tubular shaft 132 by internal splines and is axially retained in position on shaft 132 between a spacer sleeve 140 and the outer race of a ball thrust bearing 142 which also maintains concentric alignment of the sheave hub 138 and tubular shaft 132 with respect to shaft 130. Inner sheave 144 of pulley 86 is non-rotatably fixed, through its hub 146, to shaft 130 by internal splines and is axially retained in position against the inner race of bearing 142, which abuts the shaft shoulder 148, by a spacer tube 150, a washer 152 and nut 153 threaded on the end of shaft 130. Thus the two inner sheaves 136 and 144 of the complemental driven pulley 78 are axially fixed and relatively rotatable about an axis parallel to and off-set from the axis of complemental driving pulley 28. The relative axial disposition of the two complemental pulleys on the parallel axes is such that a projection on a common axis would place the fixed inner sheaves of pulley 78 midway between the fixed outer sheaves of pulley 28.

The outer sheave 154 of pulley 82 and the outer sheave 156 of pulley 86 are held in a constant axially spaced relation with each other by rods 158 and a ball thrust transfer bearing assembly 160 coaxially disposed with respect to the pulley axis and positioned between the inner sheaves 136 and 144 to permit relative rotation between pulleys 82 and 86. Rods 158 having free sliding fits in respective bushing inserts 162 fixed in apertures through the inner sheaves 136 and 144 in order that outer sheaves 154 and 156, as an assembled unit, may freely and automatically shift axially with respect to the axially fixed inner sheaves 136 and 144 whenever the inner sheave assembly 53 of the complemental driving pulley is shifted and to the degree that sheave assembly 53 is shifted. As shown, when driving sheave assembly 53 is set for high belt velocity with respect to pulley 30, the belt 80 is deep between the widespread sheaves of pulley 82 and the belt 84 is high between the closely spaced sheaves of pulley 86.

Thrust transfer bearing assembly 160 has two concentric sleeves 164 and 166, the outer sleeve 164 having an inset, inner peripheral rim 168 adjacent the left end and internal threads 170 at the other end, and the inner sleeve 166 having an inset outer peripheral rim 172 adjacent the right end and external threads 174 at its other end. One set of rods 158, each bolted at one end to outer sheave 154, are fastened at their other ends, as by riveting, to an internally threaded ring 176 which is fastened by threaded engagement with the external threads 174 of the inner sleeve 166 and thereby secures the inner race of a ball thrust bearing 178 against the outer peripheral rim 172 of the inner sleeve. A second set of rods 158 each bolted at one end to outer sheave 156, are fastened at their other ends, as by riveting, to an externally threaded ring 180 which is fastened by threaded engagement with the internal threads 170 of the outer sleeve 164 and secures the outer race of the ball thrust bearing 178 against the inner peripheral rim 168 of the outer sleeve. Note that a radial clearance is provided between the outer periphery of ring 176 and the inner periphery of sleeve 164 and between the inner periphery of ring 180 and the outer surface of sleeve 166 to assure that no frictional interengagement, other than that in ball thrust bearing 178, occurs between the relatively rotating parts of the assembly 160.

*Planetary reduction*

Within the planetary gear box 134 a main planetary system sun gear 184 is formed integral with an intermediate portion of shaft 130. This main (second) planetary system 188 includes planet pinions 186 rotatably mounted on a carrier assembly 190 and meshing with sun gear 184 and a planetary ring gear 192. The ring gear 192 is integral with the flange of a hub 194, which in turn is rotatably journalled on shaft 130 by means such as a bushing or the illustrated needle bearings 196. The end of hub 194 is equipped with integral external gear teeth to provide an output sun gear 198.

Another planetary system sun gear 200, is formed integral with the left end of tubular shaft 132. This planetary system 203, disposed on the right hand side of the main planetary system 188, will be designated as the first planetary gear assembly 203 with its pinions 202 meshing with the sun gear 200 and a planetary ring gear 204 which is non-rotatably fixed, by a stud 206, to the gear box housing 208. The planet pinions 202 are rotatably mounted on the same carrier assembly 190 which carries the planet pinions 186 of the main (second) planetary gear assembly 188. The first and second planetary systems are series coupled except when the output rotation is zero when they operate in parallel. This structure permits the belt loadings and velocities to be within like limits for the desired maximum in reverse and in and through to the maximum low speed in forward to enable the desired variable drive outputs with identical and interchangeable belts 80 and 84.

In the illustrated embodiments, a reduction of 2.7 to 1 is provided through the first planetary gear system 203 from the tubular torque shaft 132 to carrier assembly 190 which, as described, is the planet carrier for both the first and second planetary gear assemblies 203 and 188. With this 2.7 to 1 reduction between the pulley 82 for belt 80 and the carrier assembly 190, as an input to the main (second) planetary gear system 188, and with no reduction between the pulley 86 for belt 84 and the sun 184, also as an input to the main (second) planetary gear system 188, the belt loading limits and velocity ranges for belts 80 and 84 are substantially the same and are within conservative limits for long belt life. When countershaft 14, in the illustrated embodiments, rotates at 1900 r.p.m., the velocity ranges for belts 80 and 84 do not extend below or above a 3,500 to 7,500 feet per minute range.

Referring to the chart of Figure 3, the highest belt tension differential between the two sides of belt 80 through the low and reverse speed ranges is 175 pounds at the highest low range speed of 5.40 miles per hour and the highest belt tension differential between the two sides of belt 84 through the low and reverse speed ranges is 145 pounds at the highest reverse speed of 3.33 miles per hour.

The chart also shows that, for the illustrated embodiments, the speed ratio reduction gives ring gear 192 a speed range of 0.618 to 0.00 times the speed of countershaft 14 with its pulleys 30 and 32 arranged for low range forward and, continuing through to reverse, a speed range from 0.00 to 0.38 times the speed of countershaft 14 with pulleys 30 and 32 arranged for reverse.

In other modified forms of such transmissions the speed ratio reductions may be such that ring gear 192 may range from a maximum speed in low range forward between 0.50 and 0.70 times the speed of countershaft 14 with its pulleys 30 and 32 to a maximum speed in reverse between 0.30 and 0.50 times the speed of countershaft 14 with pulleys 30 and 32.

The output of the first and second series coupled planetary systems, 203 and 188 respectively, which is the sun gear 198 integral with hub 194 of ring gear 192, meshes with planet pinions 212 of a third planetary gear system 214, which pinions 212 are rotatably mounted on a planet carrier assembly 216 and also meshed with a ring gear 218. Ring gear 218 is provided with external peripheral splines 220 engaging internal teeth of discs 222 of a first disk brake assembly 224. To the left of sun gear 198, another sun gear 226 of a fourth planetary gear system 228 is splined to torque shaft 130.

The planet pinions 230 of the fourth planetary gear assembly 228 are mounted on the carrier 216 and are interchangeable with planet pinions 212. Planet pinions 230 mesh with sun gear 236 and with the fourth planetary system ring gear 232, which is interchangeable with the third planetary system ring gear 218. Ring 232 is splined to discs 222' of a second disc brake assembly 234 in a manner similar to that described for ring gear 218. The third and fourth planetary gear systems 214 and 228, are identical epicyclic reductions between sun gears 198 and 226, respectively, and the common output carrier 216.

The two disc brake assemblies 224 and 234 and their actuating mechanism 236 are built into the planetary housing members 208 and 238. An annular flange member 240, maintained in an opening 242 of the housing member 248 by housing member 208, together with housing member 208 define an annular chamber 244 which contains an axially movable annular piston 246 dividing the annular chamber into two expansible cylinder chambers 245 and 247. The cylinder chamber 245 at one end of piston 246, is open to a low speed range, forward and reverse, oil inlet 248 and cylinder chamber 247, at the other end of piston 246, is open to a high speed range oil inlet 250.

Annular piston 246 is fastened to a brake actuating ring 252 by stud members 254 having shanks 256 extending through apertures 258 in the annular flange member 240. A groove in each stud shank 256 carries a seal ring 260 to provide a fluid seal between the stud and the flange member wall. Ring gear 218 and brake disc 222 of the first disc brake assembly 224 are braked against rotation when disks 222 are squeezed between the right hand surface 262 of brake actuating ring 252 and surface 264 of the annular flange member 240 and against a rotationally fixed brake disc 266 when oil under pressure is introduced into cylinder chamber 245 through inlet 248. Ring gear 232 and brake discs 222' of the second disc brake assembly 234 are braked against rotation when discs 222' are squeezed between the left hand surface 268 of brake actuating ring 252, the surface 270 of housing member 238 and against the rotationally fixed brake disc 266' when oil under pressure is introduced into cylinder chamber 247 through inlet 250. Brake discs 266 and 266' are interchangeable and, with brake actuating rings 252 are axially slidable along a plurality of pins 272 fixed between housing 238 and the annular flanged member 240. Pins 272 will prevent rotation of discs 266 and 266' and ring 252. A schematic hydraulic control system for the disc brake actuating mechanisms 236 is illustrated in Figure 1.

In operation, a neutral transmission (no power to final drive) occurs when there is no fluid pressure against piston 246, or the fluid pressure is substantially the same in both cylinder chambers 245 and 247. This enables disengagement of both disc brake assemblies 224 and 234 to neutralize power output which results in complete stoppage of the vehicle should obstructions such as stumps or stones be encountered during operation. Such disc brake disengagement is a much quicker operation than shifting belts 80 and 84 to give zero speed. In addition this mechanism serves as an immediate pick-up and release clutch mechanism which can be declutched whenever the engine is being started.

Outputs

Carrier 216 is integral with an output stub shaft 274 having splines 276 on its end for use in power driving any mechanism in direct relation and under the same control as the vehicle drive. Shaft 274 is rotatably supported by ball bearings 278 and 280 in a bearing cage 282 which fastened to housing 238 by bolts 284. Also integral with carrier 216 is an external gear 286 meshing with a large gear 288 riveted to an axle differential assembly 290. Differential assembly 290 is rotatably supported in a differential carrier extension 292 of planetary housing member 238 by roller thrust bearings 294. The housing member 238 and hence the differential carrier extension 292 is mounted to the face 296 of an axle housing assembly 298 by bolts (not shown) through a carrier extension flange 300.

There is a fixed reduction ratio in the illustrated embodiment of 40 to 1 from ring gear 192 of the main (second) planetary gear system 188 to the vehicle driving wheels (not shown) when in low speed range, both forward and reverse drive, and from torque shaft 130 to the driving wheels. This reduction ratio of 40 to 1 includes a reduction of 3⅓ to 1 through the third planetary gear system 214 to carrier 216 if in the low speed range; or a similar reduction of 3⅓ to 1 through the fourth planetary gear assembly 228 to carrier 216 when in the high range drive. The fixed reduction ratio of 40 to 1 also includes a reduction of 2.38 to 1 from carrier gear 286 to the differential case mounted gear 288 and a further reduction of approximately 5 to 1 in additional reduction gearing such as wheel end reductions (not shown) at the ends of axle housings 298. The 40 to 1 fixed reduction behind the variable speed portion of the variable speed transmission in the low speed ranges forward and reverse and behind the variable speed drive of belt 84 in the high speed range permits belts 80 and 84 to have velocity ranges confined to within a 3,500 to 7,000 f.p.m. (feet per minute) velocity range for the required wheel torque and speed outputs and, with such belt velocities, belt tensions below 640 pounds

Operation

When the vehicle drive of Figure 1 is conditioned for low range forward or reverse drive, the first disc brake assembly 224 is engaged causing ring gear 218 to be rotationally fixed. In low range forward speeds, the input torque is delivered from countershaft 14 through pulley 30, belt 80, pulley 82, tubular shaft 132, planetary gear set 203 and carrier assembly 190 to planetary pinions 186 which are held in a force balance against teeth of both ring gear 192 and sun gear 184. For all speeds, driven rotation of sun gear 184 will be in one direction, e.g., clockwise, and the rotational direction of the carrier assembly 190 is in the same direction. For forward speeds a force also tending to rotate sun gear 184 clockwise is applied to sun gear 184 by planetary pinions 186 because the carrier 190 is overdriving relative to the main sun gear 184. This places an overdriving force on sun gear 184 tending to rotate it faster than it is being driven, resulting in torque being fed back through shaft 130, pulley 86, belt 84 and pulley 32 into countershaft 14 and can be thought of as furnishing regenerative power to countershaft 14 which permits more available power for driving belt 80. In this condition where carrier 190 is overdriving, all of the driving torque load is applied through belt 80 while belt 84, in a closed drive path, transmits the reverse tension load of feed back torque resulting from holding back the rotation of sun gear 184.

In reverse condition, the input drive torque is delivered from countershaft 14 through pulley 32, belt 84, pulley 86 and shaft 130 to sun gear 184 which now rotates the planet pinions 186 at a higher speed about their pins on the carrier 190 which is held to an underdrive rotation relative to sun gear 184. These conditions result in a force reversal between planet pinion 186 and ring gear 192 causing a counterclockwise drive of the ring gear 192. The reaction of this force transmitted to ring gear 192, on the planet pinions 186 is absorbed on the pinion pins of the carrier 190 and results in a force on the carrier at these pinion pin reaction points which is a reversal force acting in the same direction as the driven direction of carrier 190, and this reversal force will operate through the second planet gear set 203, attempting to rotate sun gear 200 faster than it is driven by shaft 132, pulley 82 and belt 80. This force reversal results in power being fed back through tubular shaft 132, pulley 82, belt 80 and pulley 30 to countershaft 14 and can be thought of as regenerative power to countershaft 14 permitting more available power for the driving belt 84. In this condition, where carrier 190 is underdriving and sun gear 184 overdriving, all driving torque load is applied through the belt 84 while belt 80, in a closed drive path, transmits the reverse tension load of feed back torque resulting from holding back rotation of the sun gear 200 and planet carrier 190.

Ring gear 192 rotates clockwise for low range forward speeds as long as the belt 80 is between a 1.65 to 1 overdrive ratio (the illustrated condition) and a 0.90 to 1 underdrive ratio and belt 84 is between 0.60 to 1 underdrive ratio (as illustrated) and 1.11 to 1 overdrive ratio. Belt 80, conditioned for an overdrive ratio of 1.65 to 1, and corresponding belt 84, conditioned for an underdrive ratio of 0.60 to 1, provide maximum low range forward drive speed whereas when belt 80 is in an underdrive ratio of 0.90 to 1 and corresponding belt 84 is in an overdrive ratio of 1.11 to 1 the vehicle drive output speed will be zero (0), as noted on the chart in Figure 3, and ring gear 192 will not rotate in either direction. This latter condition results in an equalized parallel drive between sun gear 184 and carrier 190 in the main planetary system 188 which results in the zero output drive.

Ring gear 192 rotates counterclockwise when the belt 80 is between a 0.90 to 1 underdrive ratio and a 0.60 to 1 underdrive ratio and belt 84 is between a 1.11 to 1 overdrive ratio and a 1.65 to 1 overdrive ratio. When belt 80 provides an underdrive ratio of 0.60 to 1 and the second belt 84 provides an overdrive ratio of 1.65 to 1, maximum reverse speed will be obtained.

By way of further explanation, the speed ratios from the complemental pulley assembly 28 to the driven pulleys 82 and 86 through belts 80 and 84, respectively, may be described as ranging between 0.60 to 1 underdrive ratio and 1.65 to 1 overdrive ratio. In the position shown, the pulley assembly is set for 1.65 to 1 overdrive ratio through the belt 80 and a 0.60 to 1 underdrive ratio through the belt 84. As the sheave assembly 53 is moved to the right from the position shown, by actuator 66, the speed ratio through belt 80 will decrease in an infinite number of variations from a 1.65 to 1 overdrive ratio to 0.60 to 1 underdrive ratio and the speed ratio through belt 84 will increase in an infinite number of variations from a 0.60 to 1 underdrive ratio to 1.65 to 1 overdrive ratio. It will thus be seen that the mechanical feed back of power through belt 84 in low range forward and through belt 80 in reverse contributes a regeneration of torque with minimum loss of power and maximum efficiency.

Drive for low range forward or reverse passes from ring gear 192 through its integral sun gear 198 to the third planetary gear system 214, through the carrier 216, the output stub shaft 274 and through spur gears 286 and 288 to the axle differential assembly 290.

In the vehicle drive train of Figures 2A and 2B, countershaft 14, pulleys 30, 32, 82 and 86, concentric shafts 130 and 132, sun gears 184, 200 and 226 and planetary gear carrier 190 rotate in a clockwise direction when the vehicle is driven in all of the speed ranges—high range forward, low range forward or reverse.

When the vehicle is being driven in high range forward, with the second disc brake assembly 234 engaged and ring gear 232 rotationally fixed, drive torque is delivered from countershaft 14 through pulley 32, belt 84, pulley 86, inner torque shaft 130, sun gear 226 and the fourth planetary gear assembly 228 to carrier 216 and its outputs, shaft 274 and spur gear 286. Progressively higher vehicle speeds are obtained as the speed ratio through belt 84 is increased in infinite variations from 0.60 to 1 underdrive to a 1.65 to 1 overdrive. It is of interest to note that the maximum speed setting of sheave assembly 53 for low range forward drive is a minimum speed setting for high range forward drive. With these speed settings the conditions are ideal for releasing the first brake assembly 224 and engaging the second brake assembly 234 by the fast acting brake actuating and release mechanism 236 in clutching from low range forward to high range forward. At this time there would be little if any rotation of ring gear 232 and therefore it is important that brake 234 be quickly engaged before the ring gear 232 and brake discs 222 have a chance to start rotating.

From the foregoing it is apparent that there is hereby provided a new improved power drive, for use in machines such as crop harvesting combines, with a high range of vehicle speeds for highway travel from job to job, a low range of vehicle speeds for crop harvesting operations and a reverse speed range. The improved drive provides an infinitely variable speed mechanical transmission between a predetermined limit range. It also provides a variable speed power drive with an infinite number of speeds for a maximum speed in forward to a maximum speed in reverse, any speed of which may be selected by a single speed control. Improved variable speed dual V-belt complemental pulley designs with single speed controls are also provided.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A power drive comprising: a primary planetary system with a first sun gear, a carrier, a first ring gear and planet pinions mounted on said carrier and in mesh with both said sun gear and said ring gear; a power driven countershaft; a first variable speed drive means operatively connecting said countershaft to said planetary system carrier including a second sun gear, a second ring gear and further planet pinions mounted on said carrier and meshed with both of said second sun gear and second ring gear; a second variable speed drive means operatively drive connected between said countershaft and said first sun gear; speed control means for both of said variable speed drive means; and means enabling relative rotation between said two ring gears including output means drivingly connected to one of said ring gears.

2. A drive train comprising: a first planetary transmission having two input members and one output member; a dual, complementarily variable speed mechanism, operatively drive connected with said two input members, having a single input member and a speed control operable to provide an infinitely variable number of speed ratios between said input member and said planetary transmission output member; a second transmission having two input components, one output component and selectively engageable drive paths from either of said two input components to said output component; means operatively drive connecting one of said two input members with one of said input components; and means operatively drive connecting said output member with the other of said input components.

3. A drive train comprising a parallel coupled planetary transmission having two input members and one output member; a dual, complementary variable speed mechanism, including two output members drive connected with said two input members, having a single input member and a speed control; a second planetary transmission having one output member and two input members, means independently selectively drive coupling either one of said second planetary input members to the second planetary output member, the second planetary input members being drive connected respectively to the aforementioned parallel planetary transmission output member and to one of the variable speed mechanism output members, whereby a variable high and low and a neutral control of the second planetary output member can be obtained.

4. A power drive comprising: a primary planetary system with a sun gear component, a carrier component, a ring gear component and planet pinions mounted on said carrier component in mesh with both said sun gear component and said ring gear component; a power driven countershaft; a first variable speed drive means operatively connecting said countershaft to one of said planetary system components; a second variable speed drive means operatively connecting said countershaft and a second of said planetary system components; speed control means for both of said variable speed drive means; and output mechanism having means enabling selective independent drive connection to either the third of said planetary system components, or one of the other two of said planetary system components.

5. The power drive as defined in claim 4, wherein said two variable speed drive means each have a range of infinite speed ratios from a maximum to a minimum to thereby provide the powed drive from said countershaft to said output means with a range of output speeds having an infinite number of speed settings from a predetermined maximum speed output in forward to a predetermined maximum speed output in reverse.

6. The power drive as defined in claim 4, wherein said first variable speed drive means and said second variable speed drive means are portions of a dual complemental pulley and belt mechanism.

7. The power drive as defined in claim 6, wherein said dual complemental pulley and belt arrangement includes two driving pulleys rotatably fixed to said countershaft, two belts and two driven pulleys, one being drive connected to said one planetary system component and the other being drive connected to said second planetary system component.

8. The power drive as defined in claim 7, wherein said two driving pulleys are provided with an inner set of sheaves and an outer set of sheaves, the sheaves in each set being fixed relative to each other, one set being axially restrained and the other set being axially shiftable as a unit for simultaneously adjusting the speed of said belts so one belt increases speeds by infinite variations and the other belt correspondingly decreases speeds by infinite variations dependent upon the direction of said other sheave set is shifted, with the belt toward which said other sheave set is being shifted being the belt which increases speed.

9. The power drive as defined in claim 8, wherein said two driven pulleys are provided with an inner set of sheaves and an outer set of sheaves, the sheaves in each set being axially fixed, and rotatable, relative to each other; the first set, corresponding to said one driving set, being axially shiftable as a unit to continually self seek a belt tension balancing position; and said second set, corresponding to said other driving set being axially fixed in predetermined relation to said one driving set.

10. The power drive as defined in claim 8, wherein said one sheave set is the outer sheave set and said other sheave set is the inner sheave set, said two driven pulleys having axially fixed relatively rotatable inner sheaves and two outer sheaves interconnected by bearing thrust means which permits relative rotation of said outer sheaves and maintains a predetermined axial spacing of said outer sheaves; said outer sheaves are axially shiftable as a unit which continually self seeks a belt tension balancing position; one of said driven pulleys is operatively drive connected to said planetary carrier; and the other of said driven pulleys is operatively drive connected to the sun gear of said primary planetary system.

11. The power drive as defined in claim 7, wherein said belts are similar and interchangeable.

12. A power drive comprising: a primary planetary system with a sun gear, a carrier, a ring gear and planet pinions mounted on said carrier and in mesh with both said sun gear and said ring gear; a drive shaft integral with the sun gear of said primary planetary system; a tubular drive shaft concentric about said sun gear drive shaft and operatively drive connected to the carrier of said primary planetary system; a power driven countershaft; a first variable speed drive means between said countershaft and said sun gear drive shaft; a second variable speed drive means between said countershaft and said tubular drive shaft; speed control means for both said variable speed drive means; a first planetary output system with sun, planet and ring gears; a second planetary output system with sun, planet and ring gears; the sun gear of said first planetary output system being fixed with the ring gear of said primary planetary system; an output carrier mounting said planet pinions of said first planetary output system, with said pinions meshing with the first planetary output system sun ring gear; first brake means operatively coupled to said first planetary output system ring gear; the sun gear of said second planetary output system being non-rotatably fixed to said sun gear drive shaft; the planet pinions of said second planetary gear output system mounted on said output carrier in axially spaced relation to the planet pinions of said first planetary output system, and in mesh with said second planetary output system sun and ring gears; a second brake means operatively coupled to said second planetary output system ring gear; and control means for said two brake means.

13. The power drive as defined in claim 12, wherein a gear box housing encloses said planetary system; said two brake means comprise a disc brake for each ring gear of said first and second planetary output systems, an actuating piston contained in a cylinder in said planetary gear box housing, an axially movable brake actuating ring member effective to actuate the disc brake of one or the other of the first or second planetary output system ring gears, dependent upon the direction of axial actuating movement, means connecting said brake means actuating ring member to said actuating piston, cylinder chambers at each end of said actuating cylinder and fluid pressure lines extending to said cylinder chambers from said brake control means for conveying fluid pressure to one or the other of said cylinder chambers to brake the ring gear of the first planetary gear output system for drive through the primary planetary system or to brake the ring gear of the second planetary gear out put system for direct drive from said sun gear drive shaft.

14. The power drive as defined in claim 12, further comprising: a differential and axle assembly, a gear mounted on the differential case, a splined output shaft integral with said output carrier, and an output gear integral with said output carrier and meshed with said gear mounted on the differential case.

15. A power drive comprising: a power driven countershaft; a planetary gear system comprising a sun gear, a planetary carrier, a ring gear and planet pinions rotatably mounted on said carrier; a first variable speed drive means between said countershaft and said sun gear; a second variable speed drive means between said countershaft and said carrier; a power drive output; a first brake means between said sun gear and said power drive output; a second brake means between said ring gear and said power drive output; means for controlling the speed of both said variable speed drive means; and means for independently engaging either one of said clutch means.

16. A power drive, including support structure, comprising: a primary planetary system with a sun gear component, a carrier component, a ring gear component and planet pinions mounted on said carrier in mesh with both said sun gear and said ring gear; a power driven countershaft; a first variable speed drive means including a shaft coaxially disposed relative to the planetary system and operatively connecting said countershaft to one of said planetary system components, a second variable speed drive means operatively connecting said countershaft and a second of said planetary system components; speed control means for both of said variable speed drive means; a drive output member rigid on said shaft; power output means; first brake means, carried by said support structure, shiftable to engage a portion of said power output means and establish positive drive between said drive output member and said power output means; and second brake means carried by said power support structure shiftable to engage a portion of said power output means and establish positive drive between said third planetary system component and said power output means.

17. A power drive comprising: a primary planetary system with a sun gear component, a carrier component, a ring gear component and planet pinions mounted on said carrier in mesh with both said sun gear and said ring gear; a power driven countershaft; a first variable speed drive means operatively connecting said countershaft to one of said planetary system components, a second variable speed drive means operatively connecting said countershaft and a second of said planetary system components; speed control means for both of said variable speed drive means; a preliminary planetary reduction system with a sun gear, a rotationally fixed ring gear and planet pinion gears on said primary planetary system carrier component operatively connected between one of said variable speed drive means and said carrier component; and output means drivingly connected to the third of said primary planetary system components.

18. A power drive comprising: a primary planetary system with a sun gear component, a carrier component, a ring gear component and planet pinions mounted on said carrier in mesh with both said sun gear and said ring gear; a power driven countershaft having a coaxial opening with guide slots intersecting said opening; a first variable speed drive means operatively connecting said countershaft to one of said planetary system components, a second variable speed drive means operatively connecting said countershaft and a second of said planetary system components; said first variable speed drive means and said second variable speed drive means being portions of a dual complemental pulley and belt mechanism which includes two driving pulleys rotatably fixed to said countershaft, two belts and two driven pulleys, one being drive connected to said one planetary system component and the other being drive connected to said second planetary system component, said two driving pulleys being provided with an inner set of sheaves and an outer set of sheaves, the sheaves in each set being fixed relative to each other, the outer set of sheaves being axially restrained and the inner set of sheaves being axially shiftable as a unit for simultaneously adjusting the speed of said belts so that one belt increases speeds by infinite variations and the other belt correspondingly decreases speeds by infinite variations dependent upon the direction of said other sheave set is shifted, with the belt toward which said other sheave set is being shifted being the belt which increases speed; a speed control means for both of said variable speed drive means including a hydraulic actuating cylinder with an actuating rod projecting into said countershaft opening, and a linkage arm extending through the end of said actuating rod and through said guide slots in said countershaft and connected with said inner sheave set; and output means drivingly connected to the third of said planetary system components.

19. A power drive comprising: a primary planetary system with a sun gear component, a carrier component, a ring gear component and planet pinions mounted on said carrier in mesh with both said sun gear and said ring gear; a power driven countershaft; a first variable speed drive means operatively connecting said countershaft to one of said planetary system components, a second variable speed drive means operatively connecting said countershaft and a second of said planetary components; said first variable speed drive means and said second variable speed drive means being portions of a dual complemental pulley and belt mechanism which includes two driving pulleys rotatably fixed to said countershaft, two belts and two driven pulleys, one being drive connected to said one planetary system component and the other being drive connected to said second planetary system component; said two driving pulleys being provided with an inner set of sheaves and an outer set of sheaves, the sheaves in each set being fixed relative to each other, the outer set of sheaves being axially restrained and the inner set of sheaves being axially shiftable as a unit for simultaneously adjusting the speed of said belts so that one belt increases speeds by infinite variations and the other belt correspondingly decreases speeds by infinite variations dependent upon the direction of said other sheave set is shifted, with the belt toward which said other sheave set is being shifted being the belt which increases speed; a speed control means for both of said variable speed drive means including pulley setting rods connected to and holding said inner sheave unit in assembly, said pulley setting rods projecting through openings provided in one of said outer sheaves, an outwardly extended hub on said one outer sheave; a bushing axially shiftably mounted on said outwardly extended hub; means fastened to said bushing and connecting the outer ends of said pulley setting rods, a thrust bearing axially fixed on said bushing, a shift ring rotatable on and axially fixed to said thrust bearing and shifting means connected and operable to move said shift ring; and output means drivingly connected to the third of said planetary system components.

20. A drive train comprising a planetary transmission having two input members and one output member; a dual, complementarily variable speed mechanism, including two output members drive connected with said two input members, having a single input member and a speed control; a second transmission having one output member and two input members, means independently selectively drive coupling either one of said second transmission input members to the second transmission output member, the second transmission input members being drive connected respectively to the aforementioned parallel planetary transmission output member and to one of the variable speed mechanism output members, whereby a variable high and low and a neutral control of the second transmission output member can be obtained.

21. The power drive as defined in claim 16, wherein said countershaft is power driven by means comprising: a belt driven pulley mounted on said countershaft with a slidable fit on the outwardly extended hub of one of said outer sheaves and in axial abutment with the other peripheral rim of this outer sheave; a tubular sleeve member internally splined to said counter shaft; means axially restraining said tubular member on the end of said counter shaft; inclined side teeth at the inner end of the tubular sleeve member; inclined side teeth on the outer end of the hub of said countershaft mounted driven pulley which are complementary to and engage the inclined side teeth of said tubular sleeve member; said engaged side teeth being effective to vary the spacing between outer sheaves of said complemental pulley arrangement on said countershaft for proper belt tension in the dual complemental pulley and belt arrangement belts relative to the drive torque transmitted through said belt driven countershaft mounted pulley to said countershaft.

22. The power drive as defined in claim 17, wherein the operative connection between said one variable speed means and said one component comprises a tubular drive shaft integral with the sun gear of said preliminary planetary system, and the operative connection between said second variable speed means and said second component comprises a drive shaft integral with the sun gear of said primary planetary system, concentric with and passing through said tubular drive shaft.

23. The power drive as defined in claim 19, wherein said shifting means comprises: a shift rod pivotally connected to said shift ring, a bell crank pivotally mounted on a frame member and an end of said shift rod pivotally connected to an arm of said bell crank.

References Cited in the file of this patent

UNITED STATES PATENTS

| | | |
|---|---|---|
| 2,745,297 | Andrus | May 15, 1956 |
| 2,755,683 | Ryan | July 24, 1956 |
| 2,760,386 | Southwick | Aug. 28, 1956 |
| 2,737,828 | Seybold | Mar. 13, 1956 |